United States Patent [19]
Brehmer et al.

[11] Patent Number: 5,563,799
[45] Date of Patent: Oct. 8, 1996

[54] LOW COST/LOW CURRENT WATCHDOG CIRCUIT FOR MICROPROCESSOR

[75] Inventors: Gerald M. Brehmer, Allen Park; John P. Hill, Westland, both of Mich.

[73] Assignee: United Technologies Automotive, Inc., Dearborn, Mich.

[21] Appl. No.: 337,084

[22] Filed: Nov. 10, 1994

[51] Int. Cl.$^6$ .................................................... G06F 11/30
[52] U.S. Cl. ........................ 364/481; 364/569; 364/550; 364/707; 395/185.08; 395/750; 371/61; 371/62
[58] Field of Search .................................... 327/142, 143, 327/198; 371/62, 61; 364/481, 569, 550, 707; 395/750, 550, 185.08

[56] References Cited

U.S. PATENT DOCUMENTS

| | | | |
|---|---|---|---|
| 4,879,647 | 11/1989 | Yazawa | 371/62 |
| 5,081,625 | 1/1992 | Rhee et al. | 371/16.3 |
| 5,113,504 | 5/1992 | Matsuda | 371/62 |
| 5,203,000 | 4/1993 | Folkes et al. | 327/143 |
| 5,345,583 | 9/1994 | Davis | 371/62 |
| 5,426,776 | 6/1995 | Erdman | 395/575 |
| 5,440,263 | 8/1995 | Fournel et al. | 327/143 |

OTHER PUBLICATIONS

MITSUMI ICs—Technical literature on Reset products by Mitsumi Electronic Corp., Inc.

*Primary Examiner*—Emanuel T. Voeltz
*Assistant Examiner*—Hal D. Wachsman

[57] ABSTRACT

A watchdog circuit and method are provided for monitoring a microprocessor to detect the presence of a malfunction condition such as a program lock-up. The watchdog circuit includes a first capacitor coupled to a supply voltage and a transistor having a collector and emitter coupled in parallel with the first capacitor. The transistor has a base for receiving a signal in response to a status output signal generated by the microprocessor. A voltage threshold detector is provided for comparing a voltage potential associated with the capacitor with a predetermined threshold voltage and producing a reset signal in response thereto. The threshold voltage detector produces a small current which is utilized to charge the first capacitor. The reset signal is provided to the microprocessor to initiate a reset operation which will reset the microprocessor in an attempt to eliminate the malfunction condition. Additionally, a feedback path may be provided between the output and the base of the transistor to allow for repetitive reset signals during a continuous microprocessor malfunction condition.

15 Claims, 2 Drawing Sheets

LOW COST/LOW CURRENT WATCHDOG CIRCUIT FOR MICROPROCESSOR

BACKGROUND OF THE INVENTION

1. Technical Field

This invention relates generally to microprocessor monitoring systems and, more particularly, to a low cost/low current watchdog circuit which provides reset signals to a microprocessor upon detecting a microprocessor malfunction condition.

2. Discussion

Watchdog timing devices are frequently employed to monitor the operation of a microprocessor or microprocessor-based electronic devices such as microcomputers and microcontrollers. A watchdog timer circuit generally monitors a status signal output from a monitored microprocessor and provides a reset signal to the microprocessor upon detecting a microprocessor malfunction condition. Typical microprocessor malfunction conditions include program lock-ups which freeze processing operations and problems caused by electrostatic discharge conditions, electromagnetic compatibility problems, as well as soft faults which may be caused by the presence of alpha particles, for example. The status signal output from the microprocessor generally includes a pulse train of voltage signals generated according to a substantially predetermined frequency. The pulse train signal is continuous and uninterrupted during proper execution of program operations performed by the microprocessor. However, the status signal output pulse train-ceases to exist during the occurrence of a program lock-up or other microprocessor malfunction conditions.

Conventional watchdog timer circuits are commonly designed to detect the non-occurrence of the pulse train status signal during a predetermined time period and to generate a reset signal in response thereto. The reset signal is then applied to the microprocessor reset input. The application of a reset signal operates to initiate a restart of the microprocessor. Generally, a microprocessor reset operation will restart program operations and attempt to eliminate any existing program lock-ups or other malfunctioning conditions.

Generally speaking, conventional watchdog circuits typically include a timer device for determining application of a reset signal only after the non-occurrence of pulse train signals occurs for the predetermined time period. Quite often, conventional watchdog circuits employ a voltage threshold comparator and a charging capacitor as the timer device. The capacitor holds a voltage potential that can be charged and discharged in response to the presence or absence of the status signal. The comparator compares the charged signal across the capacitor to a predetermined voltage and generates the reset signal in response thereto. Accordingly, the time required for the capacitor to charge to the threshold voltage determines the time period of the timer device.

While conventional watchdog circuits are commonly employed to monitor a wide variety of microprocessor-based devices, many commercially available watchdog circuits often require specially manufactured components. Currently, a number of microprocessor chips are equipped with built-in watchdog circuits for providing self-monitoring. However, such circuits have shown a tendency to not provide proper detection in some circumstances. Additionally, many conventional watchdog circuits tend to draw a considerable amount of current and often require multiple current paths. Heavy current draw may in turn affect the operation of the circuit and the size and tolerance of components used therein.

Accordingly, it is one object of the present invention to provide for an improved watchdog circuit that draws less current than conventional circuits and exhibits a very low quiescent current.

More specifically, it is an object of the present invention to provide for an improved watchdog circuit which employs a voltage threshold detector that draws a very small amount of current and uses the low current to charge a capacitor.

It is another object of the present invention to provide for an improved and more efficient and low cost watchdog circuit which employs commonly manufactured components.

Yet, it is also an object of the present invention to provide for a method of monitoring a microprocessor status output signal and providing a reset to the microprocessor upon detecting a malfunction condition.

It is a further object of the present invention to provide for an improved watchdog circuit which produces and applies consecutive reset output signals to a microprocessor during continued detection of a malfunction condition.

SUMMARY OF THE INVENTION

A watchdog circuit and method are provided for monitoring a microprocessor output status signal and generating a reset signal for resetting the microprocessor upon detecting a malfunction condition such as a program lock-up. The watchdog circuit includes an input for receiving a status signal output from a microprocessor. A first capacitor is coupled to a supply voltage. A transistor is provided and has a collector and emitter connected in parallel with the first capacitor and a base for receiving a signal in response to the status signal. The watchdog circuit further includes a voltage threshold detector integrated circuit coupled to the capacitor for comparing a voltage potential associated with the first capacitor with a predetermined threshold voltage. The voltage threshold detector produces a reset signal in response to the comparison. The voltage threshold detector circuit draws a small amount of current and uses this small amount of current to charge the first capacitor. An output is provided which is adapted to be coupled to the reset input of the microprocessor for providing the reset signal thereto.

BRIEF DESCRIPTION OF THE DRAWINGS

Other objects and advantages of the present invention will become apparent to those skilled in the art upon reading the following detailed description and upon reference to the drawings in which.

DETAILED DESCRIPTION OF THE PREFERRED EMBODIMENT

Figure 1:
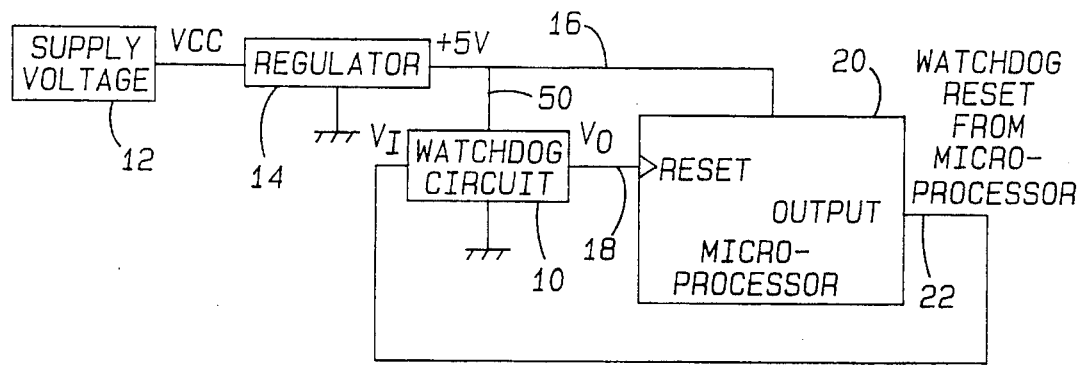
FIG. 1 is a block diagram illustrating the use of a watchdog circuit for monitoring a microprocessor in accordance with the present invention.

Turning now to FIG. 1, a watchdog circuit 10 is shown connected to a microprocessor 20 for monitoring the microprocessor 20 to detect the presence of a microprocessor malfunction condition such as a program lock-up. A supply voltage source 12 provides a direct current (DC) voltage $V_{cc}$ to a voltage regulator 14. Voltage regulator 14 in turn outputs a +5 volt DC signal which is supplied as an input to both the watchdog circuit 10 and microprocessor 20. More specifically, the watchdog circuit 10 has an input that is connected to a status output (OUTPUT) of microprocessor 20 via line 22 for receiving a status signal $V_I$ therefrom. The watchdog circuit 10 also has an output that is connected to a reset input (RESET) of microprocessor 20 via line 18 for supplying a reset signal $V_o$ thereto.

The watchdog circuit 10 monitors the status output signal $V_I$ output from microprocessor 20 to detect the presence of a malfunction condition associated with microprocessor 20. The types of microprocessors that may be monitored may include any of a number of microprocessors which have a reset input and a status output. These types of microprocessors may include the 6800 family of microprocessors, such as Model No. MC68HC05C4 for example, manufactured by Motorola, Incorporated. With the Motorola MC68HC05C4 microprocessor, the output signal can be received from a general purpose output, such as output PA2 located at pin No. 9, while the reset input may be located at pin No. 1 on a forty pin dual-in-line package (DIP) chip configuration. The status output signal generated by this type of microprocessor provides an indication of the program operating condition of the microprocessor 20. More specifically, during normal processor operations, the status output signal has a voltage pulse train alternating at a predetermined frequency in sequence with the microprocessor operating program. However, in the event that a microprocessor malfunction occurs, the status output pulse train will cease to exist. As previously mentioned, typical malfunction conditions may include a program lock-up or faults commonly associated with electrostatic discharge, electromagnetic compatibility problems or alpha particle interference.

Figure 2:
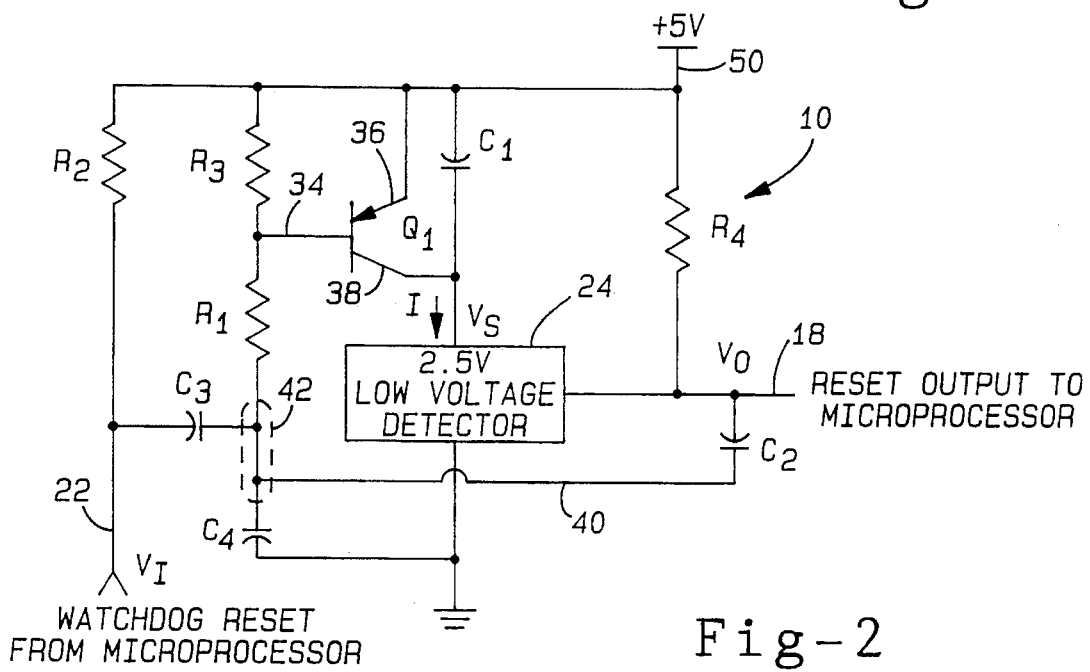
FIG. 2 is a circuit diagram which provides a detailed illustration of the watchdog circuit of FIG. 1 in accordance with the present invention.

Referring now to FIG. 2, a detailed illustration of the watchdog circuit 10 is provided according to the present invention. The watchdog circuit 10 receives input signal $V_I$ via line 22 and further receives the +5 Volt DC signal via voltage supply line 50. Watchdog circuit 10 includes a resistor $R_2$ coupled between line 22 and the voltage supply line 50. A capacitor $C_3$ is coupled between line 22 and node 42. Another capacitor $C_4$ is coupled between node 42 and ground. Circuit 10 also has a pair of resistors $R_1$ and $R_3$ coupled between node 42 and voltage supply line 50. Together, resistors $R_1$ and $R_3$ provide a voltage divider network.

The watchdog circuit 10 further includes a transistor $Q_1$. Transistor $Q_1$ is preferably a heterojunction bipolar transistor (HBT) which has a base terminal 34, an emitter terminal 36 and a collector terminal 38. The base terminal 34 of transistor $Q_1$ is connected between resistors $R_1$ and $R_3$ for receiving a divided portion of input voltage $V_I$. The emitter terminal 36 of transistor $Q_1$ is coupled to the voltage supply line 50 for receiving the +5 Volt DC signal, while the collector terminal 38 of transistor $Q_1$ is coupled to a low voltage detector 24.

The watchdog circuit 10 further has a time charged capacitor $C_1$ coupled between the +5 Volt voltage supply line 50 and the input to low voltage detector 24. Capacitor $C_1$ is therefore connected in parallel with transistor $Q_1$ across the emitter terminal 36 and collector terminal 38. According to this circuit arrangement, capacitor $C_1$ operates as a charging capacitor which charges and discharges in response to current I flowing from the +5 Volt DC signal to the voltage detector 24 and also in response to switching operations provided by transistor $Q_1$.

A resistor $R_4$ is further connected between the +5 Volt voltage supply line 50 and the output line 18 of low voltage detector 24 to provide a normally "high" output voltage $V_O$ during proper operations of microprocessor 20. In addition, a feedback line 40 is connected between output line 18 and node 42. The feedback line 40 includes a capacitor $C_2$. Feedback path 40 operates to reset the watchdog circuit 10 so as to form an oscillatory circuit that provides repeating output reset signals throughout a continuous detection of a malfunction condition. It should be appreciated that with the feedback path 40 and capacitor $C_2$ removed, the watchdog circuit 10 is a monostable circuit which provides a single pulsed (i.e., one-shot) reset output voltage $V_O$ on output line 18.

Figure 3:
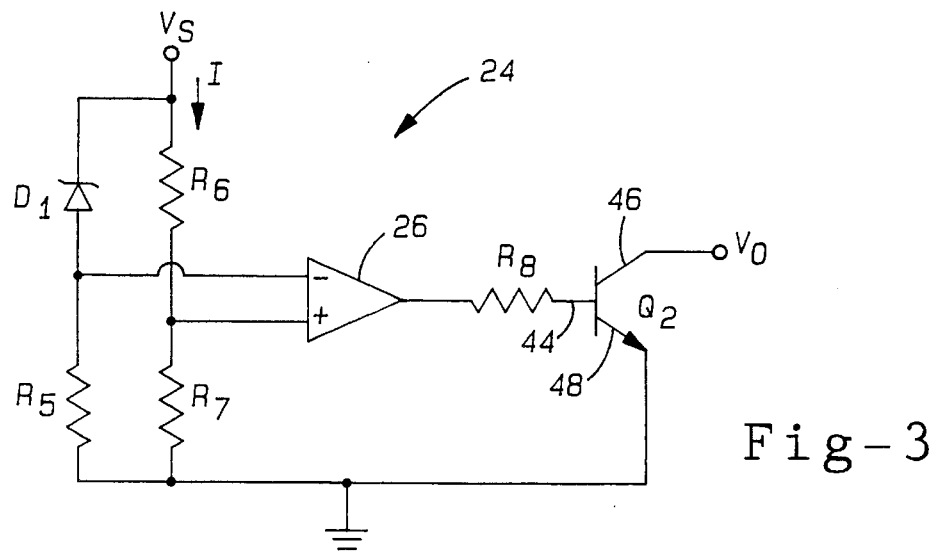
FIG. 3 is a circuit diagram illustrating the voltage threshold detector employed by the watchdog circuit of FIG. 2.

With particular reference to FIG. 3, the low voltage detector 24 is shown therein according to one preferred circuit embodiment. Voltage detector circuit 24 has a pair of resistors $R_6$ and $R_7$ coupled between an input voltage supply $V_S$ and ground. A series connected diode $D_1$ and resistor $R_5$ are connected in parallel with resistors $R_6$ and $R_7$ across input voltage supply $V_S$ and ground. The voltage detector circuit 24 includes a comparator 26 which has an inverting input terminal (−) coupled between diode $D_1$ and resistor $R_5$ and a non-inverting input terminal (+) tapped from between resistors $R_6$ and $R_7$. The output of comparator 26 is connected to a resistor $R_8$ which in turn is coupled to a transistor $Q_2$. Transistor $Q_2$ is a heterojunction bipolar transistor (HBT) which has a base terminal 44, a collector terminal 46 and an emitter terminal 48. The base terminal 44 of transistor $Q_2$ is coupled to the output of comparator 26 via resistor R8, while the collector terminal 46 is coupled to output line 18 to provide voltage output $V_O$. The emitter terminal 48 of transistor $Q_2$ is coupled to ground.

Voltage detector circuit 24 is a low current voltage comparison circuit which exhibits a very low quiescent current, while advantageously utilizing the current associated therewith to charge capacitor $C_1$. That is, voltage detector circuit 24 draws current I through capacitor $C_1$ and therefore controls the rate of current I flow through capacitor $C_1$ and the charging rate of capacitor $C_1$. The low voltage detector 24 may include a commercially available off-the-shelf voltage detecting unit such as Model No. PST518 manufactured by Mitsumi. The Mitsumi PST518 detector is an integrated circuit designed and sold as a Brown-out detector for detecting out-of-tolerance power supply conditions and generating reset signals to a microprocessor to prevent a microprocessor-based system from hanging up on power up, power down and temporary power failure. This particular voltage detector 24 and other similar detectors require very low stand-by current and provide precise threshold voltage comparisons. The watchdog circuit 10 of the present invention advantageously utilizes this type of voltage detector 24 to compare the voltage potential at one terminal of charging capacitor $C_1$ with a predetermined voltage threshold.

According to one example, with the voltage supply line 50 set to +5 volts, voltage detector circuit 24 may employ a predetermined voltage threshold of approximately +2.5 volts. Additionally, voltage detector circuit 24 preferably draws a current I of less than twenty microamps (20 μA) and is capable of drawing current I as low as nine microamps (9

μA) or less with the above-identified preferred example by Mitsumi. Additionally, the voltage detector circuit 24 is connected to capacitor $C_1$ in a cascode configuration. This advantageously allows the current I drawn by voltage detector circuit 24 to also be used to charge capacitor $C_1$.

Figure 4A:
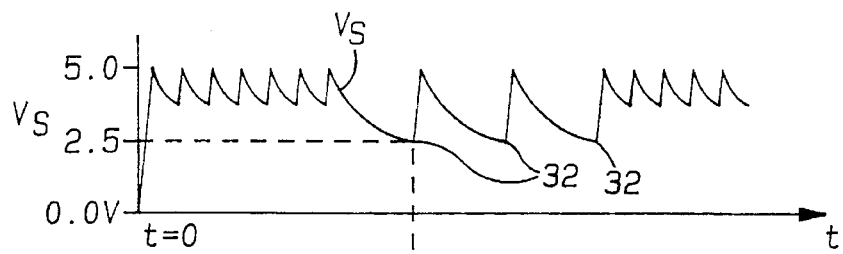
FIGS. 4A through 4C are voltage waveforms exhibited by the watchdog circuit of the present invention according to one example.
Figure 4B:
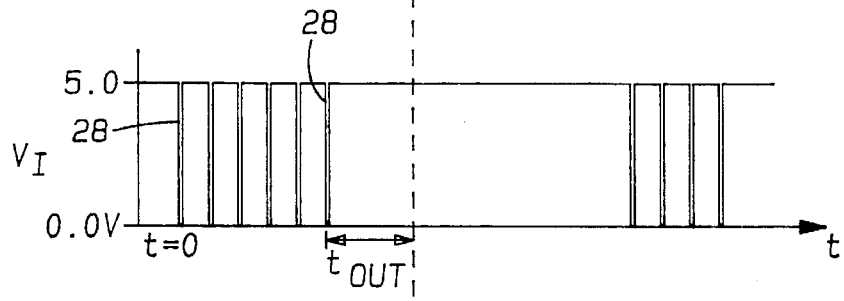
Figure 4C:
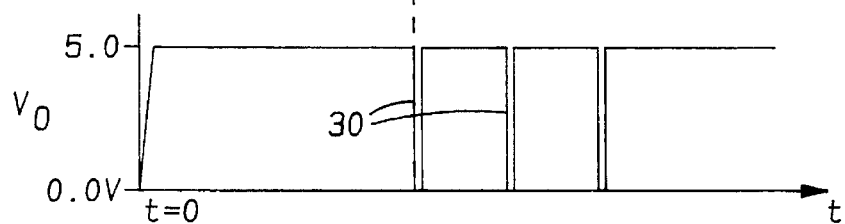

The operation of the watchdog circuit 10 will now be described with reference to FIGS. 2 and 3 and further with reference to the timing diagrams provided in FIGS. 4A through 4C. As previously mentioned, the monitored microprocessor 20 generates a status output signal which includes a voltage pulse train during normal processing operations, absent a program lock-up condition, electrostatic discharge condition, electromagnetic capability problems or other possible malfunction conditions. An example of a microprocessor output status signal is shown identified as voltage $V_I$ in FIG. 4B. The voltage pulse train $V_I$ provides a series of negative voltage pulses 28 occurring at a predetermined frequency continuously throughout normal microprocessor processing operations.

The output status signal $V_I$ received by watchdog circuit 10 is voltage divided by resistors $R_1$ and $R_3$ and supplied to the base terminal 34 of transistor $Q_1$. Capacitor $C_3$ prevents an instantaneous change in voltage thereacross. Charging capacitor $C_1$ is supplied with the +5 volt voltage input via supply line 50 and capacitor $C_1$ therefore charges as a function of current I flowing through capacitor $C_1$ as controlled by voltage detector circuit 24. Accordingly, during charging of capacitor C1, the voltage input $V_S$ to voltage detector 24 will decrease over time from an initial +5 volts. Each periodic pulsing of status output signal $V_I$ causes transistor $Q_1$ to turn "on" thereby discharging capacitor $C_1$ and resetting voltage $V_S$ to +5 volts. A high voltage on output status signal $V_I$ turns "off" transistor $Q_1$. Once transistor $Q_1$ turns off, capacitor $C_1$ begins to charge once again.

During the charging process, the voltage detector 24 operates as a current sink by using the current draw I of detector 24 to charge capacitor $C_1$. The current I supplied thereto is preferably on the order of twenty microamps or less. Capacitor $C_1$ will continue to charge until transistor $Q_1$ is turned "ON" in response to a negative voltage pulse on voltage $V_I$ or until capacitor $C_1$ is fully charged or current I no longer flows through capacitor $C_1$. Capacitor $C_1$ will reach full charge when current 1 is no longer drawn therethrough. The voltage input $V_S$ to detector circuit 24, as shown in FIG. 4A, is continuously compared with a predetermined threshold voltage set in the low voltage detector 24. When capacitor $C_1$ charges enough so that the voltage potential $V_S$ supplied to the voltage detector 24 drops to the predetermined threshold voltage of about +2.5 volts as set by voltage detector 24, the reset voltage $V_O$ will be pulled low by voltage detector 24. The low reset voltage $V_O$ is illustrated by voltage drops 30 as shown in FIG. 4C. Each low pulse 30 of reset voltage $V_o$ in turn will cause a reset of microprocessor 20.

As long as the input voltage $V_I$ is pulsed frequently, the voltage input $V_S$ to voltage detector 24 will not drop to the threshold voltage set by voltage detector 24. Under such conditions, a reset will not occur. When the voltage across capacitor $C_1$ is less than the threshold voltage of the voltage detector 24, the output voltage $V_O$ will go low and reset microprocessor 20. Feedback path 40 and capacitor $C_2$ will operate to reset the watchdog circuit 10 thereby allowing the output voltage $V_o$ to continually oscillate during a microprocessor malfunction condition as shown by the plurality of voltage drops 30 in FIG. 4C. This in turn provides multiple continuous resets until the input voltage $V_I$ is pulsed. A reset of microprocessor 20 will typically cause the microprocessor to restart the program operations. This in turn will attempt to eliminate any program lock-ups or other causes of the detected malfunction condition.

The time period expiration between multiple resets is determined by the time constant $T_{OUT}$. The time constant $T_{OUT}$ is directly related to the circuit values provided by resistors $R_1$ and $R_3$ and capacitors $C_2$, $C_3$ and $C_4$. These circuit values are selected to provide a desired RC timing circuit as should become evident to those in the art.

The watchdog circuit 10 according to one example may include the following circuit values. Resistors $R_1$, $R_2$ and $R_3$ each have a resistance of about 10 kΩ, while resistor $R_3$ has a resistance of 33 kΩ. Capacitors $C_1$, $C_3$ and $C_4$ each have a capacitance of about 0.1 μF, while capacitor $C_2$ has a capacitance of about 0.01 μF. Transistor $Q_1$ is an HBT transistor which may include transistor MPSA56. The voltage detector 24 has a predetermined voltage threshold that is preferably selected to +2.5 volts for a given +5 volt DC supply line 50 voltage. However, various other voltage threshold voltages may be employed.

While the watchdog circuit 10 of the present invention has been described in accordance with a preferred embodiment, it should be appreciated that the present invention is not limited to the embodiment shown and other changes and modifications can be made without departing from the spirit of the invention. For example, other various low current voltage detectors may be employed. In addition, other types of microprocessors may be monitored with the watchdog circuit 10. For example, Model No. MC68HC05C4+ manufactured by Motorola, Incorporated may be employed and which already has a watchdog circuit equipped therewith. The watchdog circuit 10 of the present invention may be connected in parallel to the watchdog circuit already equipped on the given microprocessor. This provides for added reset monitoring with an improved watchdog circuit 10 that may detect reset conditions not otherwise detectable with some built-in microprocessor monitoring circuitry.

Figure 5:
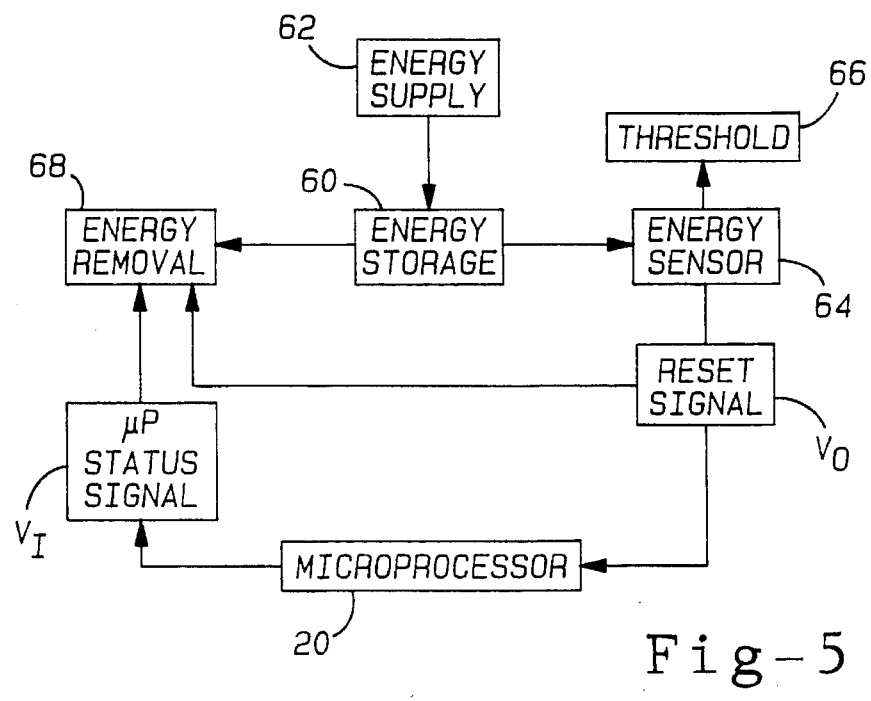
FIG. 5 is a block diagram illustrating some of the general principles of the watchdog circuit of the present invention.

Referring finally to FIG. 5, a generalized block diagram is provided in order to demonstrate some of the principles of the present invention. As shown therein, an energy storage device 60 receives energy from an energy supply device 62. Energy sensor 64 senses the energy in energy storage device 60 and compares the measured energy to a threshold amount 66. In so doing, energy sensor 64 advantageously controls the rate of energy flow from energy supply 62 to energy storage device 60. The energy sensor 64 generates the reset signal $V_o$ in response to the comparison of the measured energy with the threshold amount 66. In turn, reset signal $V_o$ is input to microprocessor 20 via a reset input.

The microprocessor 20 generates a microprocessor status signal $V_I$ which in turn is provided to energy removal block 68. Energy removal block 68 has the ability to dump the energy stored in energy storage device 60 in response to a status signal $V_I$ that is indicative of proper operation of the microprocessor 20. During a malfunction condition, energy storage device 60 will continue to store energy therein and will not have energy removed therefrom until the microprocessor 20 operates properly or the reset signal $V_o$ initiates energy removal so as to allow for multiple reset outputs which can repeatedly attempt to reset microprocessor 20.

The above description in combination with FIG. 5 illustrates how the present invention applies to the detection of an amount of energy and is therefore not limited solely to a voltage comparison as taught by the preferred embodiment described herein. For example, the teachings of the present invention may be applicable to monitoring a current signal associated with an inductor which is charged in response to a voltage differential as should be apparent to one in the art.

While this invention has been disclosed in connection with a particular example thereof, no limitation is intended thereby except as defined in the following claims. This is because a skilled practitioner recognizes that other modifications can be made without departing from the spirit of this invention after studying the specification and drawings.

What is claimed is:

1. A low current watchdog circuit for monitoring a microprocessor status signal and producing a reset signal, said watchdog circuit comprising:

an input for receiving the status signal output from a microprocessor;

an energy storage device adapted to receive energy from an energy supply;

a sensor for sensing an amount of energy associated with the energy storage device and comparing the sensed amount of energy associated with the energy storage device with a threshold amount and producing a reset signal in response to the comparison, the sensor controlling the rate of energy flow into the energy storage device; and an output adapted to provide the reset signal to the microprocessor;

wherein the sensor includes a voltage detector for monitoring a voltage potential across a voltage charging capacitor associated with the energy storage device, the voltage detector operating as a current sink to draw a small current that charges the capacitor, thus providing a watchdog circuit exhibiting a low quiescent current.

2. The circuit as defined in claim 1 further comprising energy removal means for removing energy from the energy storage device.

3. The circuit as defined in claim 2 wherein said energy removal means removes energy from the energy storage device in response to the reset signal so as to allow for repeated reset signals.

4. A low current watchdog circuit for monitoring a microprocessor status signal, comprising:

input means for receiving a status signal output from a microprocessor;

a first capacitor coupled to a supply voltage;

a transistor having a collector and emitter connected in parallel with said first capacitor, said transistor further having a base for receiving a signal in response to said status signal;

a voltage threshold detector for comparing a voltage potential associated with said first capacitor with a predetermined threshold voltage and producing a reset signal in response to detecting a microprocessor malfunction condition, said threshold voltage detector operating as a current sink to draw a small current that charges said first capacitor, thus providing a watchdog circuit exhibiting a low quiescent current; and output means adapted to be coupled to a reset input of said microprocessor for providing said reset signal to the microprocessor.

5. The circuit as defined in claim 4 wherein said voltage threshold detector comprises an integrated circuit which draws a current of 20 microamps or less.

6. The circuit as defined in claim 4 further comprising a feedback path coupled between the output means and the base of the transistor so as to produce repetitive reset signals during a microprocessor malfunction condition.

7. The circuit as defined in claim 6 wherein said feedback path comprises a second capacitor and a resistor, said second capacitor and resistor determining a time constant between adjacent multiple reset signals.

8. A low current watchdog circuit for monitoring a microprocessor status signal and producing a reset signal in response to detecting a malfunction condition, said circuit comprising:

input means for receiving a status signal output from a microprocessor;

a first capacitor having a first terminal coupled to a supply voltage;

a transistor having a collector and emitter connected in parallel with said first capacitor, said transistor further having a base for receiving a signal in response to said status signal;

a voltage threshold detector integrated circuit coupled to a second terminal of said first capacitor for comparing a voltage potential associated with said first capacitor with a predetermined threshold voltage, said detector circuit producing a reset signal in response to detection of a microprocessor malfunction condition, and said threshold voltage detector operating as a current sink to draw a small current that charges said first capacitor, thus providing a watchdog circuit exhibiting a low quiescent current; and output means adapted to be coupled to a reset input of said microprocessor for providing a reset signal to the microprocessor.

9. The watchdog circuit as defined in claim 8 further comprising a feedback path coupled between the output means and the base of the transistor so as to produce a repetitive reset signal during a microprocessor malfunction condition.

10. The watchdog circuit as defined in claim 9 wherein said feedback path comprises a second capacitor and a resistor, said second capacitor and resistor determining a time constant between adjacent multiple reset signals.

11. The watchdog circuit as defined in claim 8 wherein said threshold detector circuit draws a current of 20 microamps or less.

12. A method for monitoring a microprocessor status signal and providing a reset signal to a microprocessor in response to detection of a malfunction condition, said method comprising:

receiving a status signal output from a microprocessor;

charging a capacitor with a small current drawn by a threshold voltage detector to achieve a voltage potential, the threshold voltage detector operating as a current sink to charge the capacitor, thus providing a monitoring method exhibiting a low quiescent current;

discharging the capacitor with a transistor controlled in response to the status signal;

comparing a voltage potential at one terminal of the capacitor with a predetermined voltage potential provided by said threshold voltage detector; and generating a reset signal in response to said step of comparing and providing said reset signal to a microprocessor to reset the microprocessor upon detecting a malfunction condition.

13. The method as defined in claim 12 further comprising the step of producing pulsed reset signals during a continuous detection of a malfunction condition, said pulsed reset signals being separated by a time constant.

14. The method as defined in claim 12 wherein the reset signal is generated when the voltage potential at said one terminal of the capacitor drops below the threshold voltage.

15. The method as defined in claim 12 wherein said current draw is about 20 microamps or less.

* * * * *